(12) United States Patent
Deivasigamani et al.

(10) Patent No.: US 10,682,589 B2
(45) Date of Patent: Jun. 16, 2020

(54) CONDENSATE NEUTRALIZER SYSTEM INCLUDING CONDENSATE DEVICE HEALTH MONITORING

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 0 days.

(21) Appl. No.: 16/657,715

(22) Filed: Oct. 18, 2019

(65) Prior Publication Data

US 2020/0047080 A1 Feb. 13, 2020

Related U.S. Application Data

(62) Division of application No. 15/859,169, filed on Dec. 29, 2017, now Pat. No. 10,486,082.

(51) Int. Cl.
*B01D 5/00* (2006.01)
*F24H 8/00* (2006.01)
(Continued)

(52) U.S. Cl.
CPC ........... *B01D 5/009* (2013.01); *B01D 5/0051* (2013.01); *B01D 53/002* (2013.01); *B01D 53/346* (2013.01); *C02F 1/688* (2013.01); *F24B 7/005* (2013.01); *F24H 8/006* (2013.01); *G01M 3/04* (2013.01); *B01D 53/40* (2013.01); *B01D 2258/0283* (2013.01); *C02F 1/66* (2013.01);
(Continued)

(58) Field of Classification Search
CPC .......... B01D 2258/0283; B01D 53/002; B01D 53/346; B01D 53/40; B01D 5/0051; B01D 5/009; C02F 1/66; C02F 1/688; C02F 2209/008; C02F 2209/02; C02F 2209/06; C02F 2209/32; C02F 2209/40; F24B 7/005; F24H 8/006; Y02B 30/106; G01M 3/04

See application file for complete search history.

(56) References Cited

U.S. PATENT DOCUMENTS

| 4,289,730 A | 9/1981 | Tomlinson | |
|---|---|---|---|
| 2014/0193308 A1* | 7/2014 | Chauvin | C02F 1/66 422/216 |

FOREIGN PATENT DOCUMENTS

DE 102007050020 A1 * 4/2009 ............... C02F 1/66

* cited by examiner

*Primary Examiner* — Terry K Cecil
(74) *Attorney, Agent, or Firm* — Tracy Jong Law Firm; Tracy P. Jong; Cheng Ning Jong

(57) ABSTRACT

A condensate neutralizer system for treating condensate of a condensate generating device, the condensate neutralizer system including a container having an inlet and an outlet, the inlet is configured to receive condensate from the condensate generating device, the container is configured to contain a condensate neutralizing material useful for treating the condensate and the outlet is configured to drain condensate treated with the condensate neutralizing material; a controller; and a pH meter functionally connected to said controller, the pH meter is configured to take pH measurements of the treated condensate, the measurements are configured to be compared to a fault pattern, wherein the fault pattern is defined by a condition where the pH measurements are lower than a pre-determined pH level and if a fault is determined to exist, a warning is raised or a delivery of replenishment of the condensate neutralizing material is initiated.

3 Claims, 14 Drawing Sheets

(51) Int. Cl.
*F24B 7/00* (2006.01)
*B01D 53/34* (2006.01)
*C02F 1/68* (2006.01)
*B01D 53/00* (2006.01)
*G01M 3/04* (2006.01)
*C02F 1/66* (2006.01)
*B01D 53/40* (2006.01)

(52) U.S. Cl.
CPC .... *C02F 2209/008* (2013.01); *C02F 2209/02* (2013.01); *C02F 2209/06* (2013.01); *C02F 2209/32* (2013.01); *C02F 2209/40* (2013.01); *Y02B 30/106* (2013.01)

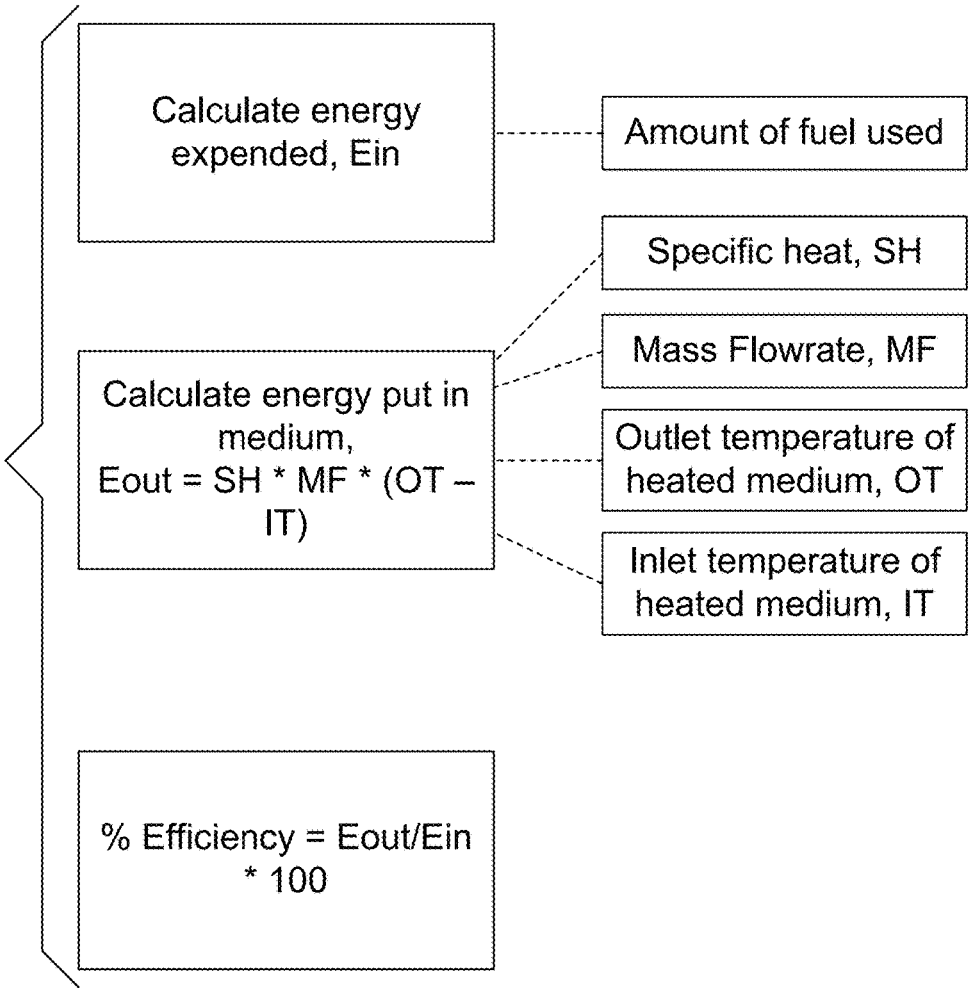

CONDENSATE NEUTRALIZER SYSTEM INCLUDING CONDENSATE DEVICE HEALTH MONITORING

PRIORITY CLAIM AND RELATED APPLICATIONS

This divisional application claims the benefit of priority from non-provisional application U.S. Ser. No. 15/859,169 filed Dec. 29, 2017 and provisional application U.S. Ser. No. 62/439,918 filed Dec. 29, 2016. Each of said applications is incorporated by reference in its entirety.

BACKGROUND OF THE INVENTION

1. The Field of the Invention

The present invention relates to a condensate neutralizer system. More specifically, the present invention is directed to a condensate neutralizer system adapted to receive condensate from a condensate generating device, the condensate neutralizer system is capable of indicating the depletion of condensate neutralizing material and alerting a stakeholder of such a condition and health monitoring for the condensate generating device.

2. Background Art

Condensate generation is one of the hallmarks of a high efficiency (e.g., greater than 90% efficiency) condensing combustion system. A high efficiency condensing combustion system achieves high efficiency by condensing water vapor in the flue gases and recovering its latent heat of vaporization. The result is condensed vapor that is typically collected and put through a neutralizer and drained. Condensate is an acidic solution containing various concentrations of nitric, nitrous, sulfuric, sulfurous acids and hydrochloric acids and can be harmful for drainage pipes, septic tanks, treatment plants and other waste handling systems. In conventional neutralizer systems, calcium carbonate may be used as a neutralizing agent to raise the pH of collected condensate before it is drained as an effluent. However, conventional condensate neutralizer systems put the burden of proper condensate neutralization on the shoulders of their users or maintenance personnel, or collectively their stakeholders. In many occasions, stakeholders have neglected to either come up with or follow maintenance schedules. Further, preventative maintenance of condensate neutralizing materials may cause unnecessary replacement of still effective neutralizing materials, thereby causing unnecessary waste not only in the neutralizing materials but also additional labor.

U.S. Pat. No. 4,289,730 to Tomlinson (herein after Tomlinson) discloses a high efficiency domestic furnace incorporating means for separating and neutralizing flue gas condensate. Acidic condensate from the flue gas products of combustion is neutralized by contact with neutralizing material in a housing through which the condensate is flowed. The use of the neutralizer in connection with a high efficiency domestic furnace permits discharge of the condensate directly to the household drain. The neutralizer is arranged to be self-flushing and defines a serpentine, series flow path and is arranged to discharge the neutralized condensate as a result of the entry of additional acidic condensate at its inlet. The neutralizing material is a consumable material and therefore it depletes when it comes in contact with condensate. Once Tomlinson's condensate neutralizing material is depleted, the user is not alerted and for the proper functioning of Tomlinson's neutralizer, a maintenance schedule must be made available and adhered to in order to ensure sufficient neutralizing material is available for neutralizing condensate. Further, in Tomlinson, there are no measures to determine the quality of the effluent. Therefore, it is possible that the condensate is not properly neutralized (even with some neutralizing material remaining in the neutralizer but still discharged.

There exists a need for a condensate neutralizer system that is capable of alerting a stakeholder to replenish depleting neutralizing materials. There also exists a need for a condensate neutralizer system that is capable of facilitating replenishment of neutralizing materials by automatically causing replenishment materials to be sent to a stakeholder of the condensate neutralizer such that the neutralizing materials can be readily replenished.

SUMMARY OF THE INVENTION

In accordance with the present invention, there is provided a condensate neutralizer system for treating condensate of a condensate generating device, the condensate neutralizer system including a container having an inlet and an outlet, the inlet is configured to receive condensate from the condensate generating device, the container is configured to contain a condensate neutralizing material useful for treating or neutralizing the condensate and the outlet is configured to drain condensate treated with the condensate neutralizing material; a controller; and a pH meter functionally connected to said controller, the pH meter is configured to take pH measurements of the treated condensate, the measurements are configured to be compared to a fault pattern, wherein the fault pattern is defined by a condition where the pH measurements are lower than a pre-determined pH level and if a fault is determined to exist, a first action selected from the group consisting of a warning communicated to a stakeholder of said condensate neutralizer system, a delivery of replenishment of the condensate neutralizing material to a stakeholder of said condensate neutralizer system and combinations thereof, is effected.

In one embodiment, the fault pattern further includes a condition where the pH measurements indicate a "knee."

In one embodiment, there is provided a condensate neutralizer system for treating condensate of a condensate generating device, the condensate neutralizer system including a container having an inlet and an outlet, the inlet is configured to receive condensate from the condensate generating device, the container is configured to contain a condensate neutralizing material useful for treating or neutralizing the condensate and the outlet is configured to drain condensate treated with the condensate neutralizing material; a controller; and a pH meter functionally connected to the controller, the pH meter is configured to take pH measurements of the treated condensate, the measurements are configured to be compared to a fault pattern, wherein the fault pattern is defined by a condition where the pH measurements indicate a "knee and if a fault is determined to exist, a first action selected from the group consisting of a warning communicated to a stakeholder of said condensate neutralizer system, a delivery of replenishment of the condensate neutralizing material to a stakeholder of said condensate neutralizer system is effected and combinations thereof.

In one embodiment, the fault pattern further includes a condition where the pH measurements are lower than a pre-determined pH level.

In one embodiment, the output is a warning communicated to a stakeholder of the condensate neutralizer system. In another embodiment, the output is a delivery of replenishment to a stakeholder of the condensate neutralizer system.

In one embodiment, the condensate neutralizer system further includes a leak sensor configured for indicating a leak from the container, wherein if a leak is detected, a second action including a warning communicated to a stakeholder of the condensate neutralizer system is effected.

In one embodiment, the condensate neutralizer system further includes a level sensor configured for indicating the level of the condensate neutralizing material contained within the container, wherein the indicated level is configured to be compared to a pre-determined material level and if the indicated level is determined to be lower than the pre-determined material level, a third action selected from the group consisting of a warning communicated to a stakeholder of said condensate neutralizer system, a delivery of replenishment of the condensate neutralizing material to a stakeholder of said condensate neutralizer system and combinations thereof, is effected.

In one embodiment, the condensate neutralizer system further includes a temperature sensor configured for indicating a temperature of the condensate at the inlet of the container, wherein the indicated temperature is configured to be compared to a pre-determined temperature and if the indicated temperature is determined to be lower than the pre-determined temperature, a fourth action comprising a warning communicated to a stakeholder of said condensate neutralizer system is effected.

In one embodiment, the condensate is communicated to the container via a drainage line and the condensate neutralizer system further includes a level sensor configured for indicating the level of the condensate in the drainage line and the indicated level is configured to be compared to a pre-determined level and if the indicated level is determined to be higher than the pre-determined level, a fifth action comprising a warning communicated to a stakeholder of said condensate neutralizer system is effected.

In one embodiment, the controller further includes a wireless transmitter configured to broadcast any one of the outputs to a wireless receiver. In one embodiment, the condensate wireless receiver is an internet router.

In one embodiment, the condensate neutralizer system further includes a health monitoring system configured for monitoring the health of the condensate generating device adapted to heat a medium flowing through the condensate generating device. In one embodiment, the health monitoring system includes:
 (a) a first temperature sensor configured for indicating the temperature of a medium at an inlet of the condensate generating device;
 (b) a second temperature sensor configured for indicating the temperature of the medium at an outlet of the condensate generating device;
 (c) a first flowrate sensor configured for indicating the flowrate of the medium through the condensate generating device, wherein an energy output quantity is calculated by deriving the amount of energy used in raising the temperature at the inlet of the condensate generating device to the temperature at the outlet of the condensate generating device in a period of time given the flowrate of the medium through the condensate generating device in the period of time; and
 (d) a second flowrate sensor configured for indicating the flowrate of a fuel supply to the condensate generating device that causes the difference between the temperature of the medium at the outlet and the inlet of the condensate generating device, wherein an energy input quantity is calculated by deriving the amount of energy put into the condensate generating device from the flowrate of the fuel supply over the period of time,
wherein a ratio of the energy output quantity to the energy input quantity is compared to a pre-determined efficiency and if the pre-determined efficiency is greater than the ratio by a pre-determined amount, a warning is raised.

In one embodiment, the controller is further configured to estimate the amount of usage of the condensate neutralizing material by summing:
 (a) a first amount of generated condensate, wherein the first amount of generated condensate is calculated by multiplying a first condensate generating rate corresponding to a rate at which condensate is generated when the condensate generating device operates in a high efficiency mode and the amount of time the condensate generating device operates in the high efficiency mode; and
 (b) a second amount of generated condensate, wherein the second amount of generated condensate is calculated by multiplying a second condensate generating rate corresponding to a rate at which condensate is generated when the condensate generating device operates in a lower efficiency mode and the amount of time the condensate generating device operates in the lower efficiency mode.

In one embodiment, the condensate neutralizer system further includes a safety monitoring system configured for monitoring the safety of at least one stakeholder of the condensate generating device. In one embodiment, the safety monitoring system includes a gas detector. In another embodiment, the safety monitoring system includes a carbon monoxide detector.

In one embodiment, pH measurements are configured to be compared to a pattern, wherein the pattern is defined by a condition where the pH measurements exhibit a dropping trend followed by a rising trend, a number of occurrence of the condition is computed, if the number of occurrence of the condition exceeds a pre-determined number, the first action is selected from the group consisting of a warning communicated to a stakeholder of the condensate neutralizer system, a delivery of replenishment of the condensate neutralizing material to a stakeholder of the condensate neutralizer system is effected, a warning communicated to a stakeholder of the condensate generating device to indicate that maintenance is due and combinations thereof.

In one embodiment, there is further provided a condensate neutralizer system including a container including a first end, a second end, a baffle adapted to divide the container into an upper space and a lower space, an inlet disposed on the first end of the container in the lower space, an outlet disposed on the first end of the container in the upper space, a plurality of apertures disposed on the baffle between the first end of the container and the second end of the container, the plurality of apertures increase in size from the first end to the second end, wherein the upper space is configured to receive a condensate neutralizing material and the inlet of the container is configured to receive a condensate that flows through the lower space, the plurality of apertures, the condensate neutralizing material in the upper space to exit through the outlet of the container.

In one embodiment, the condensate neutralizer system further includes a sensor configured for detecting a leak from the container and the conductivity of the contents of the leak to isolate the source of the leak to a blockage in the outlet or a leak generated outside of the condensate neutralizer system.

In one embodiment, the container further includes a bottom surface, a leak sensor and at least one capillary disposed on the bottom surface adjacent the leak sensor, the at least one capillary is configured for drawing a leak to the leak sensor.

An object of the present invention is to provide a condensate neutralizer system having a means for determining the quality of post-treated condensate and reminding a stakeholder of a need to take an action to replenish the consumables in the condensate neutralizer.

An object of the present invention is to provide a condensate neutralizer system having more than one means for anticipating that the consumables in the condensate neutralizer need to be replenished to ensure that depleted consumables can be timely replenished.

An object of the present invention is to provide a means for facilitating the replenishment of neutralizing materials when the amount of neutralizing materials has been detected to be low.

An object of the present invention is to provide a means for monitoring the health of a condensate generating device by verifying the efficiency at which the condensate generating device operates.

An object of the present invention is to provide a means for detecting a safety hazard potentially caused at a condensate generating device.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 13 is a diagram depicting the factors considered in calculating the efficiency of a condensate generating device.

FIG. 14 is a diagram depicting the factors considered in estimating the consumption of condensate neutralizing material.

PARTS LIST

Figure 1:
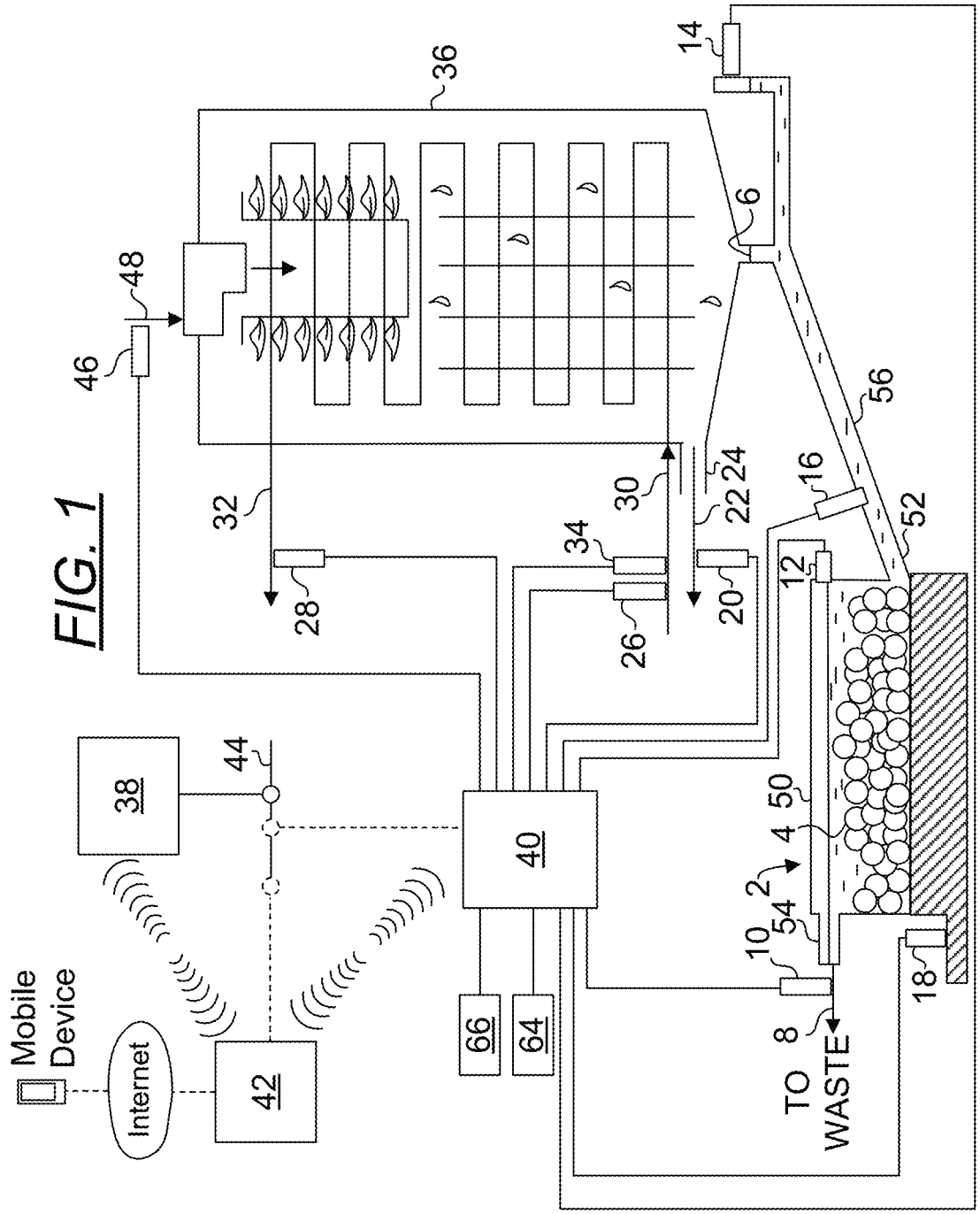
FIG. 1 is a diagram depicting a condensate neutralizer system and the equipment configured for monitoring the health of a tankless water heater which supplies condensate neutralized in the condensate neutralizer system.

2—condensate neutralizer system
4—condensate neutralizing material, e.g., calcium carbonate
6—pre-treated condensate
8—post-treated condensate
10—pH meter
12—condensate neutralizing material level sensor
14—level sensor
16—condensate temperature sensor
18—leak sensor
20—flue temperature sensor
22—flue
24—flue exhaust
26—inlet temperature sensor
28—outlet temperature sensor
30—inlet of fluid to be heated
32—outlet of heated fluid
34—flowrate sensor
36—condensate generating device
38—controller for condensate generating device
40—controller for condensate neutralizer system
42—router 44—communication bus
46—fuel flowrate sensor
48—fuel flow
50—container
52—inlet of condensate neutralizer
54—outlet of condensate neutralizer
56—drainage line
58—portion indicating accelerating drop in pH
60—baffle
62—aperture
64—gas detector
66—carbon monoxide detector
68—period of pH drop
70—period of pH recovery
72—operational setting of condensate generating device
74—pH reading
76—portion indicating operational setting of condensate generating device not discernibly affecting the pH readings
78—capillary
80—overflow channel

PARTICULAR ADVANTAGES OF THE INVENTION

The present condensate neutralizer system is capable of detecting a condition where the condensate neutralizing materials have become nearly depleted, thereby capable of alerting a stakeholder of the condensate neutralizer that the condensate neutralizing materials will soon need to be replenished. If condensate continues to be allowed to be drained into a catchment and/or sewer when condensate neutralizing material has been completely depleted, the acidic condensate can cause corrosion to exposed equipment or paths of the catchment and/or sewer.

If condensate neutralizing materials have not been replenished upon an alert that the condensate neutralizing materials is running low, the condensate neutralizer will run out of condensate neutralizing materials. The present condensate neutralizer provides a means for verifying the result of treatment of condensate via a pH meter. An under-treated stream of condensate (due to the depletion of condensate neutralizing materials) will result in a pH value that is lower, indicating that its acidic contents have not be properly neutralized with calcium carbonate or another condensate neutralizing material. In one embodiment, upon detecting this condition, the condensate generating device from which the condensate originates can be instructed to turn off. In another embodiment, upon detecting this condition, an alert is issued to the stakeholder of the condensate generating device. This alert is preferably configured to convey the urgency of the condition detected.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The term "stakeholder" is used herein to mean a user, maintenance personnel, repair personnel, etc., or any personnel that uses, maintains or repairs, owns or manages a condensate neutralizer system and/or a condensate generating device connected to the condensate neutralizer system.

FIG. 1 is a diagram depicting a condensate neutralizer system 2 and the equipment configured for monitoring the health of a tankless water heater which supplies condensate neutralized in the condensate neutralizer system 2. The condensate neutralizer system 2 includes a container 50 having an inlet 52 and an outlet 54, a controller 40 and a pH meter 10. The inlet 52 is configured to receive condensate 6 from the condensate generating device 36, e.g., a tankless water heater, the container 50 is configured to contain a condensate neutralizing material 4 useful for treating the condensate 6 and the outlet 54 is configured to drain condensate 8 treated with the condensate neutralizing material 4. The pH meter 10 is functionally connected to the controller 40 and is configured to take pH measurement of the effluent of condensate neutralizer system 2. The condensate generating device or more specifically, tankless water heater 36 in this instance, includes a burner configured to receive a fuel/air mixture or hereinafter, fuel flow 48 to heat the fluid or water flow received via an inlet 30 of a tube and exits via an outlet 32 of the tube. During operation of the tankless water heater 36, flue gas 22 that is generated due to combustion at the burner is guided to an exit via flue exhaust 24. A condensate generating device is typically equipped with its own controller 38 and a host of sensors, e.g., inlet water temperature sensor, outlet water temperature sensor, water flowrate sensor, flue temperature sensor functionally connected to controller 38. Inlet water temperature sensor 26, outlet water temperature sensor 28, water flowrate sensor 34 may be provided in addition to the native sensors already provided with the condensate generating device 36 at time of manufacture to avoid the need to tap into these sensors. However, if necessary, the readings of such sensors may readily be obtained by controller 40 from controller 38 via either a wired communication bus 44 or wirelessly via internet router 42. A fuel flowrate sensor 46 that is functionally connected to controller 40 is configured to provide the fuel flowrate to controller 40. Further, a flue temperature sensor 20 that is also functionally connected to controller 40 is configured to provide the flue temperature at flue exhaust 24. In one embodiment, the energy efficiency of a condensate generating device is inferred from its flue temperature as reported by the flue temperature sensor 20. Upon obtaining the flue temperature, the efficiency of the condensate generating device is looked up from a factory calibrated table correlating flue temperature readings and efficiency of a condensate generating device.

Figure 2:
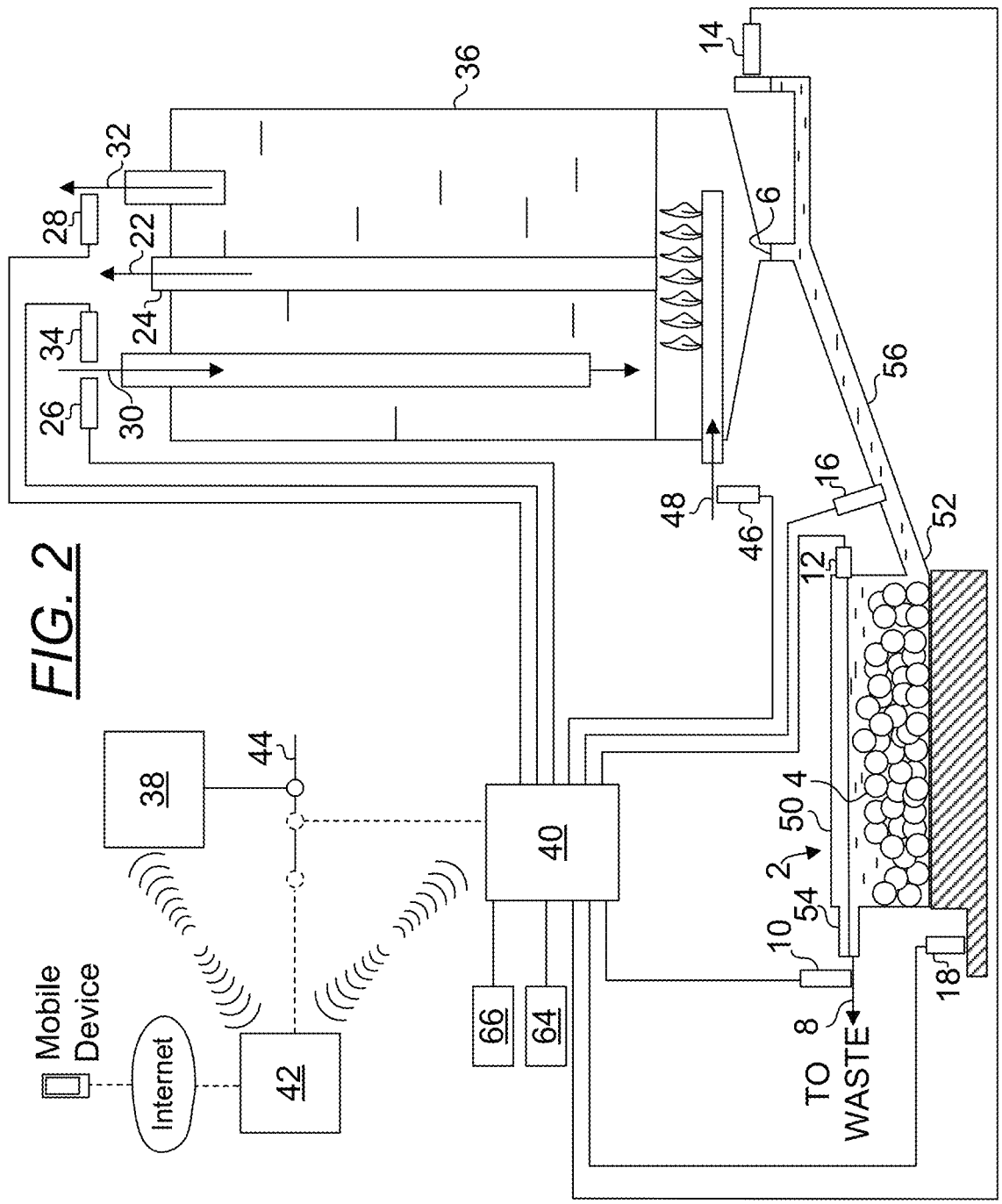
FIG. 2 is a diagram depicting a condensate neutralizer system and the equipment configured for monitoring the health of a tank water heater which supplies condensate neutralized in the condensate neutralizer system.
Figure 3:
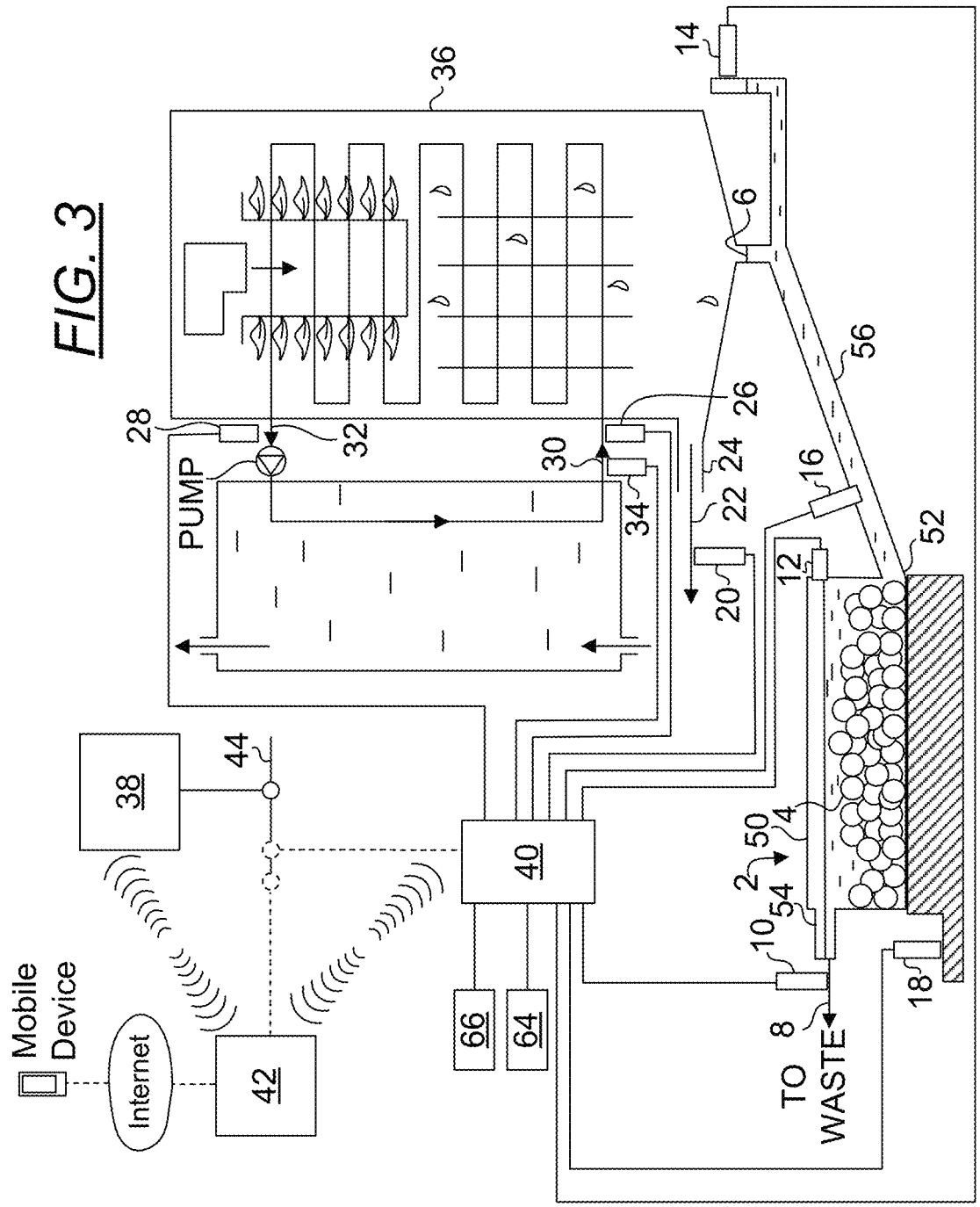
FIG. 3 is a diagram depicting a condensate neutralizer system and the equipment configured for monitoring the health of a boiler water heater which supplies condensate neutralized in the condensate neutralizer system.
Figure 4:
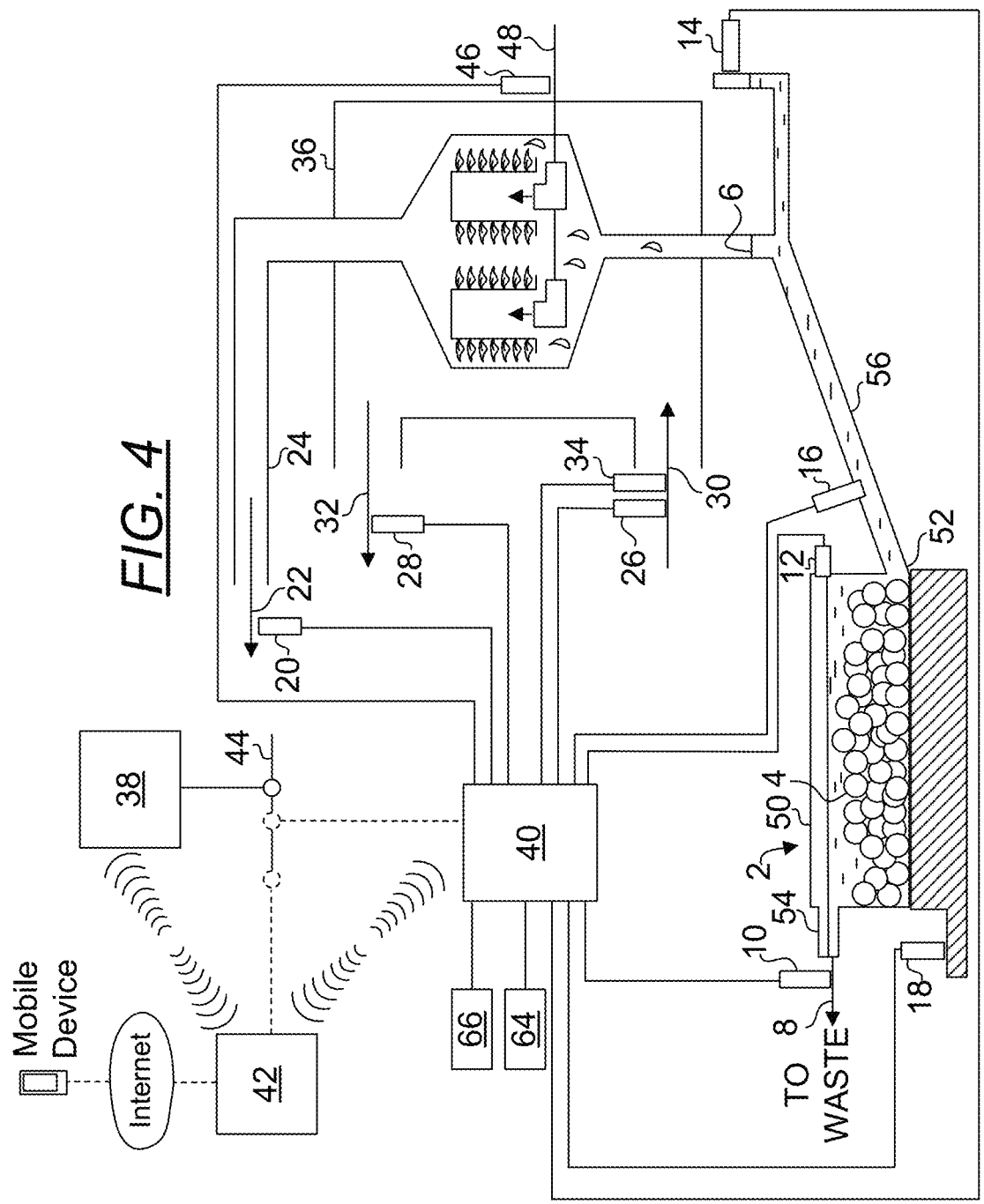
FIG. 4 is a diagram depicting a condensate neutralizer system and the equipment configured for monitoring the health of a furnace which supplies condensate neutralized in the condensate neutralizer system.

FIG. 2 is a diagram depicting a condensate neutralizer system and the equipment configured for monitoring the health of a tank water heater 36 which supplies condensate neutralized in the condensate neutralizer system 2. FIG. 3 is a diagram depicting a condensate neutralizer system and the equipment configured for monitoring the health of a boiler water heater 36 which supplies condensate neutralized in the condensate neutralizer system 2. FIG. 4 is a diagram depicting a condensate neutralizer system and the equipment configured for monitoring the health of a furnace 36 which supplies condensate neutralized in the condensate neutralizer system 2.

Although the condensate generating devices 36 shown in FIGS. 1-4 may be configured differently, the health of each device 36 can be monitored based on using the same set of sensors disclosed for FIG. 1 configured for their respective specific medium. The medium used in the tankless, tank and boiler heaters is a liquid, e.g., water while the medium used in the furnace is gas, e.g., air.

Figure 5:
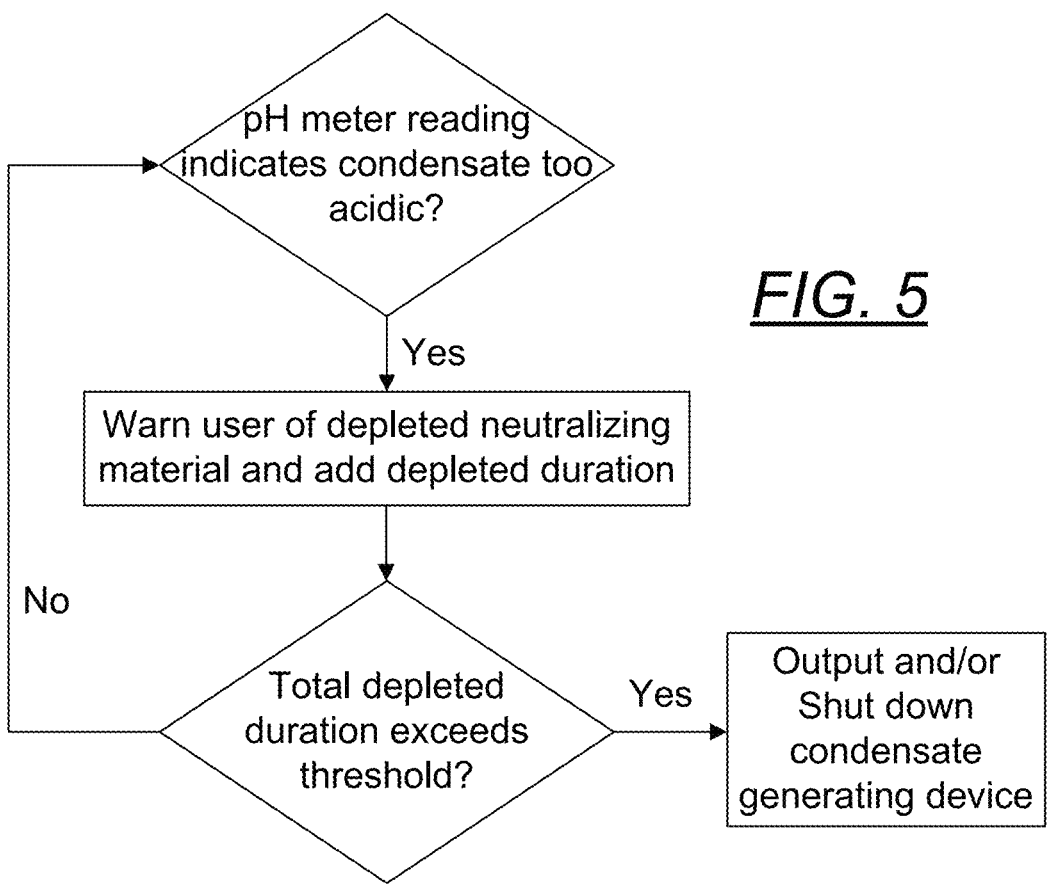
FIG. 5 is a flow diagram depicting a method used for alerting a stakeholder of a depleting condensate neutralizing material condition.

In one embodiment as shown in FIGS. 1-4, the condensate neutralizer system further includes a safety monitoring system configured for monitoring the safety of at least one stakeholder of the condensate generating device. In one embodiment, the safety monitoring system includes a gas detector 64. In another embodiment, the safety monitoring system includes a carbon monoxide detector 66. Upon detecting a gas (or fuel) leak and/or the presence of carbon monoxide, the gas detector 64 and/or carbon monoxide detector 66 are/is configured to shut down the condensate generating device and report such a gas leak and/or presence of carbon monoxide to at least one stakeholder such that proper actions can be taken by the at least one stakeholder. FIG. 5 is a flow diagram depicting a method used for alerting a stakeholder of a depleting condensate neutralizing material condition. The pH measurement is configured to be compared to a pre-determined pH level within the controller and if the pH measurement indicates an acidity level that is lower than the pre-determined pH level, an output is effected. In one embodiment, the pre-determined pH level is from about 4 to about 5.5. In another embodiment, the pre-determined pH level is from about 4 to about 5.5 and the pH measurements indicate a sustain pH level that is sustained for over about 5 minutes. Referring back to FIGS. 1-4, in one embodiment, the output is a warning communicated to a stakeholder of the condensate neutralizer system from controller 40 via, e.g., the router 42 and the internet and any mobile devices, e.g., mobile phone or pad, etc. In another embodiment, the output is a delivery of replenishment to a stakeholder of the condensate neutralizer system 2. If the stakeholder continues to ignore the warning, i.e., if the level sensor 12 fails to detect a replenishment, i.e., the level continues to be low after an extended amount of time, the stakeholder has an option to instruct controller 40 to issue a shutdown command to the controller 38 such that the "depleting neutralizing material" condition can be communicated as a fault of the condensate generating device 36 which may garner greater attention to correct this condition.

Figure 6:
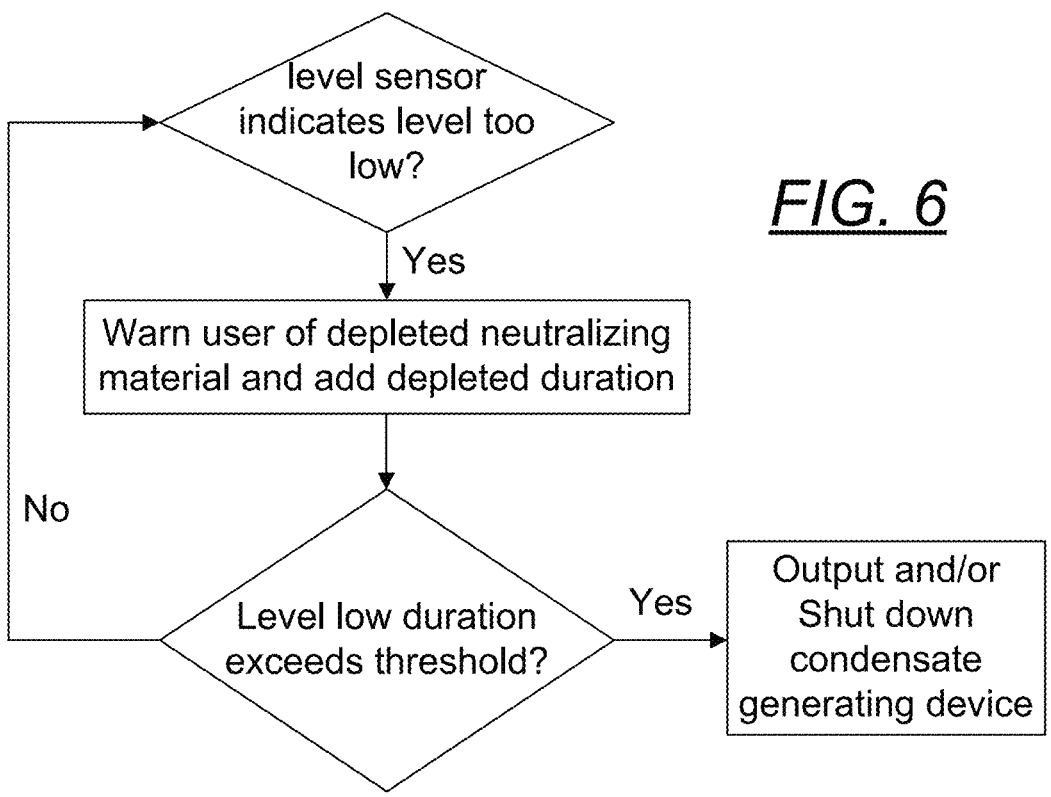
FIG. 6 is a flow diagram depicting a method used for alerting a stakeholder of a depleting condensate neutralizing material condition.

FIG. 6 is a flow diagram depicting a method used for alerting a stakeholder of a depleting condensate neutralizing material condition. The level sensor 12 is configured for indicating the level of the condensate neutralizing material contained within the container 50. The indicated level is configured to be compared to a pre-determined material level and if the indicated level is determined to be lower than the pre-determined material level, an output is effected. Again, the output can be actions identical to those disclosed for FIG. 5.

Figure 7:
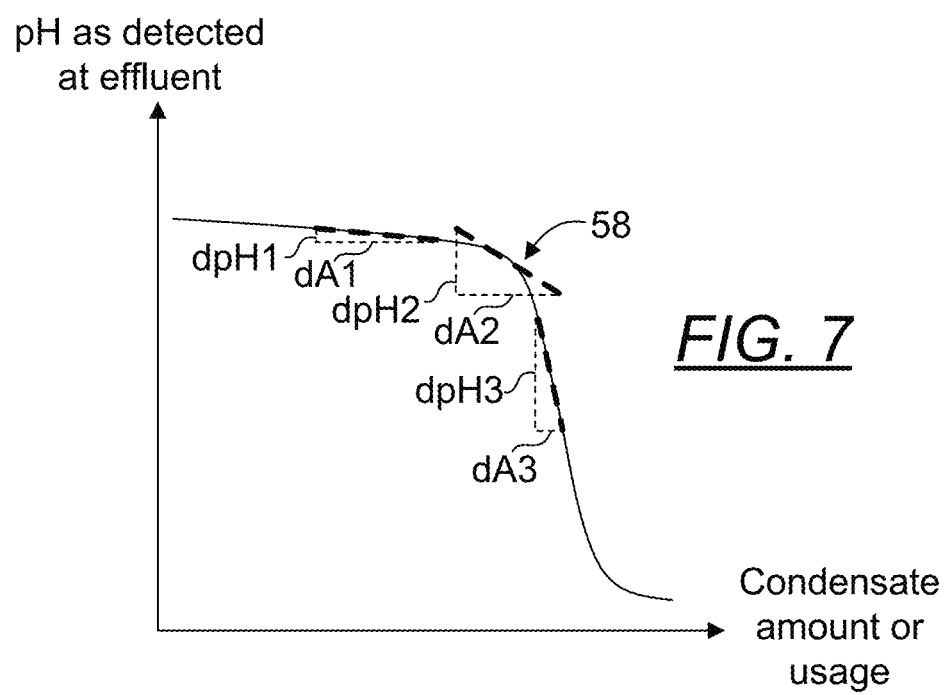
FIG. 7 is a diagram showing the quality of condensate with respect to the amount of condensate which has gone through an amount of condensate neutralizing material.

FIG. 7 is a diagram showing the quality of condensate with respect to the amount of condensate which has gone through an amount of condensate neutralizing material. In lieu of the level of pH that may be used to indicate a depleting condensate neutralizing material condition, an accelerating drop in pH may be used to detect this condition. In one instance, an accelerating drop in pH indicated as portion 58 (or a "knee") may be used to provide an early indication that the depletion of condensate neutralizing material is imminent. As more condensate neutralizing material is depleted as more condensate is being generated, there is less condensate neutralizing material that is exposed to the generated condensate in order to neutralize it. For instance, a normal operating condition of a condensate neutralizer system is a condition where the drop of pH as detected by a pH meter in a condensate neutralizer system is gradual, i.e., the change in pH or dpH1 is small compared to an amount of generated condensate dA1 or time. In other words the ratio dpH1/dA1 is small. As the condensate neutralizing material in the container is getting depleted, the change in pH or dpH2 over an amount of generated condensate dA2 becomes larger. The amount of neutralizing material available for neutralizing reactions with the condensate becomes small enough that it is now insufficient to "keep up." If the condensate neutralizing material is not replenished, the change in pH or dpH3 becomes even larger over an amount of generated condensate dA3. In detecting a "knee," one need not be concerned with microscopic or localized pH drop and recovery patterns as disclosed elsewhere herein. In one example, a pH drop of about 2 over a period of about 5 minutes indicates that a "knee" has occurred and that the condensate neutralizing material will soon need to be replenished or the condensate that continues to be generated will not be neutralized properly. A reminder for informing a stakeholder may be automatically generated or an order for replenishment of condensate neutralizing material may be automatically placed as disclosed elsewhere herein.

Figure 7A:
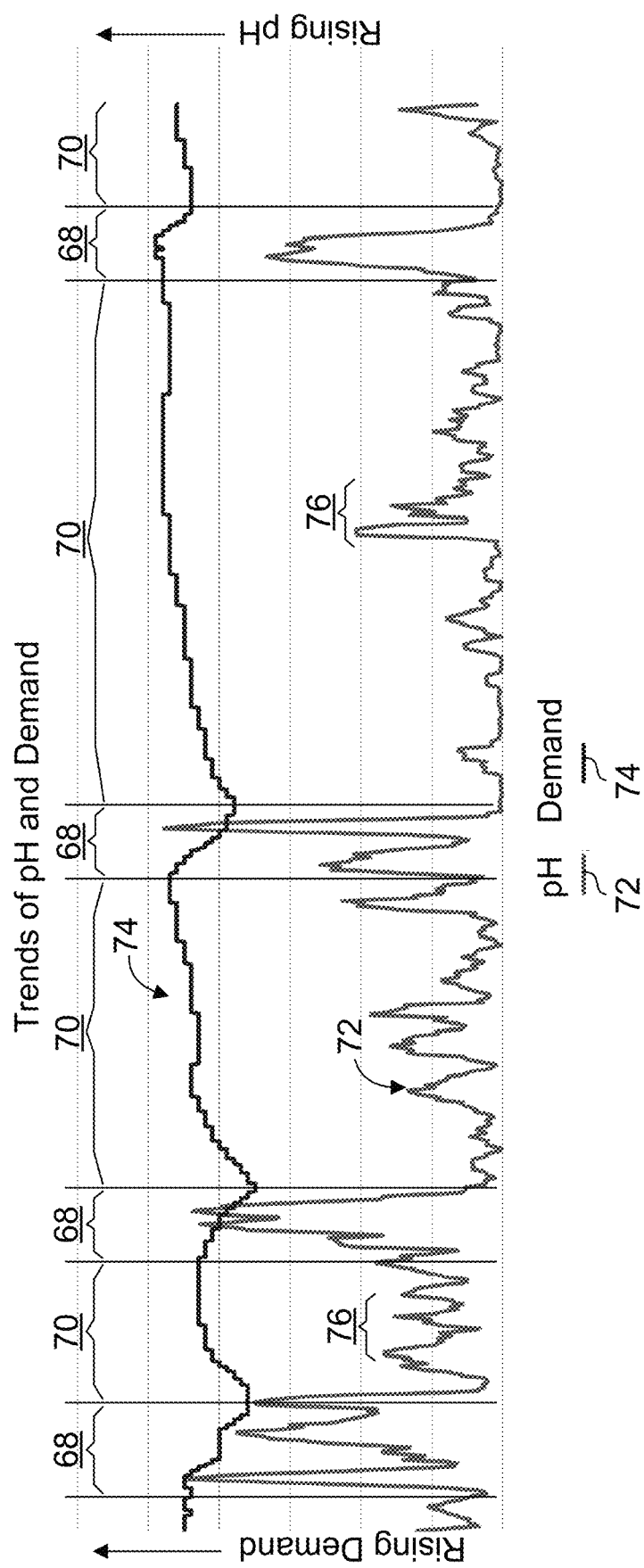
FIG. 7A is a sample data set depicting pH responses of a condensate neutralizer system as condensate generated from a condensate neutralizing device flows through condensate neutralizing material.

FIG. 7A is a sample data set depicting pH responses of a condensate neutralizer system as condensate generated from a condensate neutralizing device flows through condensate neutralizing material. pH readings 74 are collected over this period of time and plotted along with operational setting 72 of a condensate generating device producing a condensate stream that is being neutralized by a condensate neutralizing material in a container from which this pH readings are obtained. This set of data can be thought of as a set of data that is collected in the region prior to the "knee" in FIG. 7 or the region where the slope is dpH1/dA1. The vertical axis represents pH values while the horizontal axis represents time. Note that the pH readings 74 exhibit two distinct patterns as related to demand, operational setting, intensity or firing rate of the condensate generating device, e.g., a hot water heater. In a period labelled 68, pH readings appear to decrease, a sign that condensate is being generated. This period coincides with an increased demand or intensity of the condensate generating device, e.g., increased power output (or turning on) of the condensate generating device, e.g., in this case, measured in BTU/hr. In a period labelled 70, pH readings appear to increase, a sign that condensate is being neutralized. This period coincides with a decreased demand of the condensate generating device, e.g., decreased power output (or turning off) of the condensate generating device. If the pH readings return to the prior level or a level approximate that of the prior level, it is said that there is sufficient condensate neutralizing material to neutralize the generated condensate. Over time, pH readings become incapable of returning to the level prior to the generation of the condensate as the condensate neutralizing material is getting depleted. When condensate is generated and drained into the condensate neutralizer system, the region in which pH readings are taken becomes more acidic in a period labelled 68. When condensate ceases to be generated and drained into the condensate neutralizer system, the region in which pH readings are taken becomes less acidic in a period labelled 70. In one example, a pH drop of about 1 over about 10 minutes indicates that the demand for a condensate generating device is high while a pH rise of about 1 over about 10 minutes indicates that the demand for the condensate generating device is low. In one embodiment, the mechanism shown in FIG. 5 is the only mechanism used to detect a need for replenishment of the condensate neutralizing material. In another embodiment, the detection of a "knee" is the only mechanism used to detect a need for replenishment of the condensate neutralizing material. In yet another embodiment, both the mechanism shown in FIG. 5 and the detection of a "knee" are used to bolster the confidence that a need for replenishment of the condensate neutralizing material has been detected. In other words, if both conditions occur simultaneously, the composite condition serves as a confirmation that it is highly likely that the condensate neutralizing material is being exhausted imminently. Referring back to FIG. 7A, it shall be noted that at certain operational settings (e.g., at portions 76), there is insufficient amount of condensate generated to cause a discernible drop in pH. The severity of the drops and rises due to the turn-on and turn off cycles or production of condensate is a function of the size of the neutralizer system. A large neutralizer system capable of holding a large amount of condensate neutralizer materials will produce smaller drops and rises in pH while a small neutralizer system capable of holding a limited amount of condensate neutralizer materials will produce larger drops and rises in pH.

In a water heater, space heating furnace or another condensate generating device, a flow sensor and one or more additional sensors may be used to gauge the amount of usage of the condensate generating device for maintenance purposes. For example, after delivering heated air of a certain volume or for a certain duration, a space heating furnace may be required to be serviced where the air filter may need to be replaced. Applicants discovered that the occurrence and magnitude of the drops in pH in a condensate neutralizer system closely represent the operational settings of the condensate generating device which produces the condensate. Therefore, in addition to providing an estimate of usage of the condensate neutralizing materials and the schedule for getting the materials replaced, the data obtained from a pH meter can be used to estimate the usage of the condensate generating device and its maintenance schedule. On condensate generating devices which are not equipped with appropriate equipment for estimating their usage, a present condensate neutralizer system can be used for estimating such usage. Therefore, maintenance can be performed on demand rather than a fixed schedule which either requires that a part be serviced or replaced too early or too late.

Figure 8:
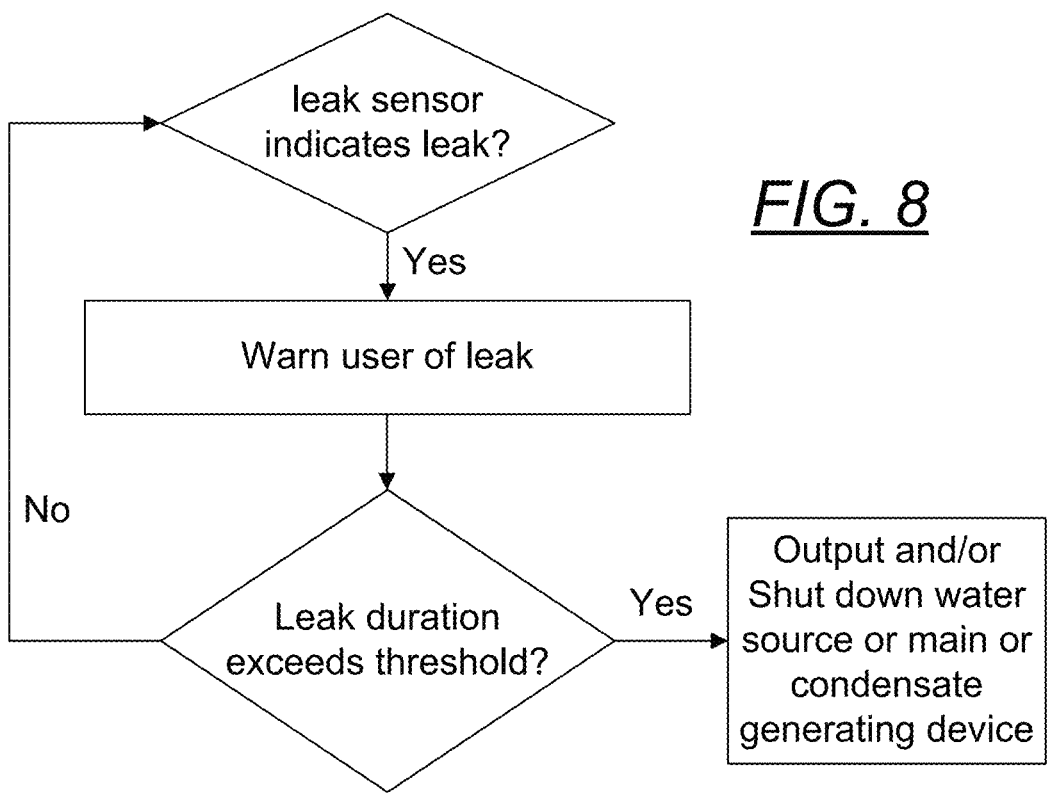
FIG. 8 is a flow diagram depicting a method used for alerting a stakeholder of a leakage in a condensate drainage system.

FIG. 8 is a flow diagram depicting a method used for alerting a stakeholder of a leakage in a condensate drainage system and/or the condensate generating device. Referring to FIGS. 1-4 and 8, the condensate neutralizer system 2 further includes a leak sensor 18 configured for indicating a leak from the container 50 or a leak from the condensate generating device, wherein if a leak is detected, an output is effected. The output can be a shutdown action of the water source or main which feeds into the condensate generating device and/or the condensate generating device itself.

Figure 9:
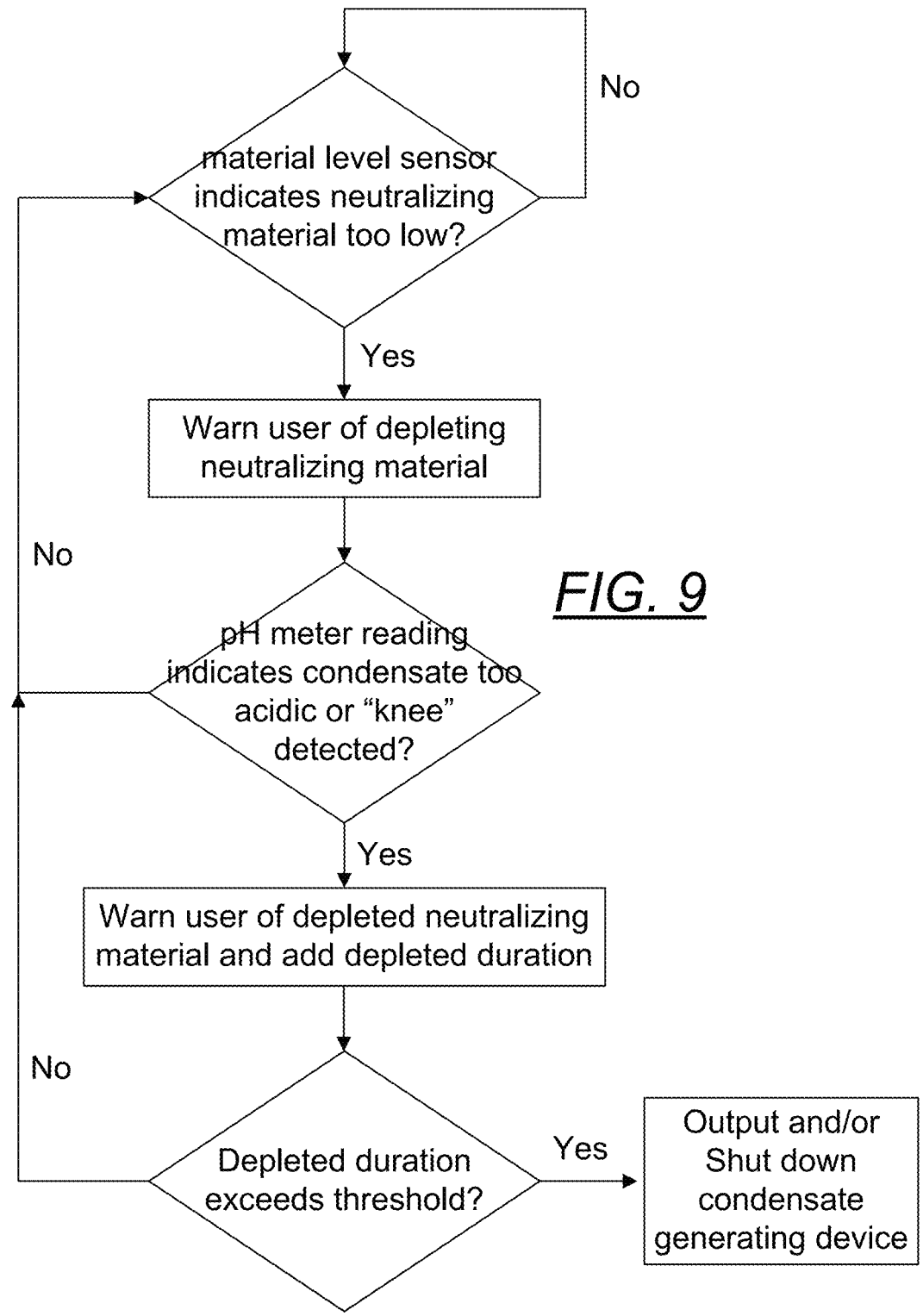
FIG. 9 is a flow diagram depicting a method used for alerting a stakeholder of a depleting condensate neutralizing material condition.

FIG. 9 is a flow diagram depicting a method used for alerting a stakeholder of a depleting condensate neutralizing material condition. Referring to FIGS. 1-4 and 9, the condensate neutralizer system 2 includes a level sensor 12 configured for indicating the level of the condensate neutralizing material contained within the container, wherein the indicated pH level is configured to be compared to a pre-determined material level and if the indicated pH level is determined to be lower than the pre-determined material level, an output is effected. Another condition which further indicates a depleting condensate neutralizing material is the occurrence of a "knee." Again, the output can be actions identical to those disclosed for FIG. 5. As shown in FIG. 9, a pH check can be combined with the level check to provide an output that indicates a higher urgency to replenish the condensate neutralizing material.

Figure 10:
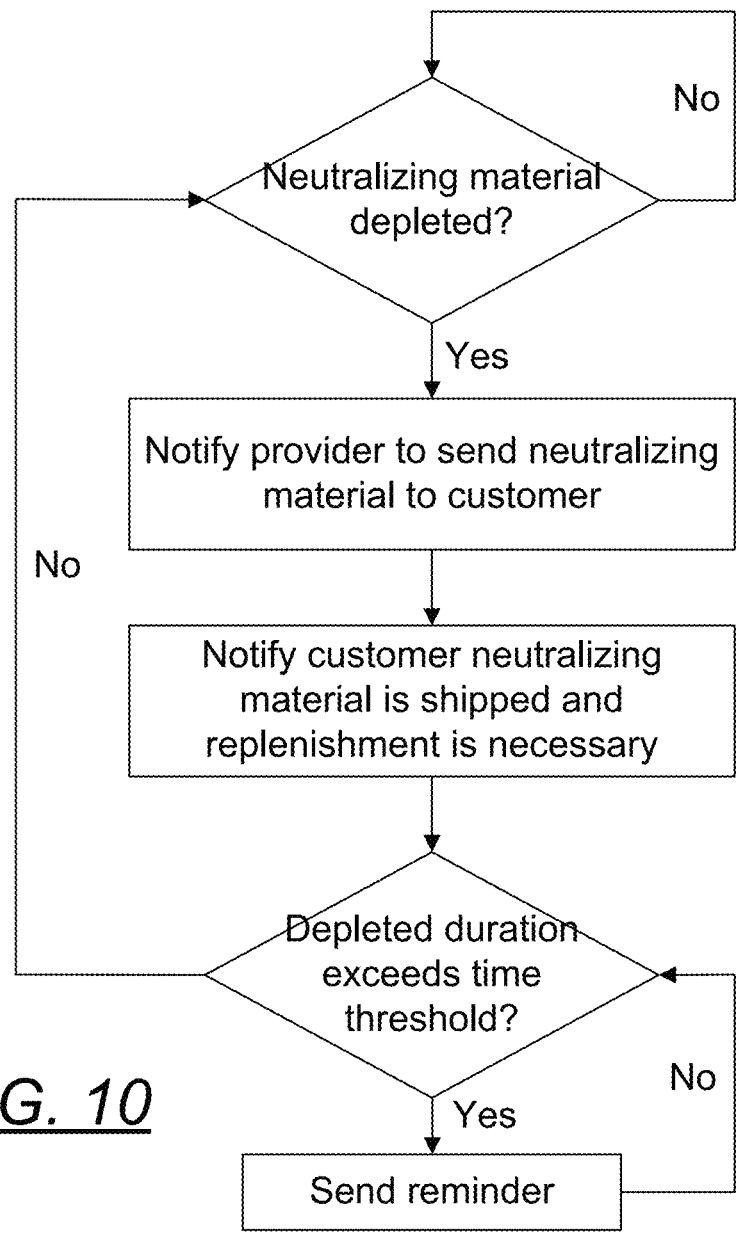
FIG. 10 is a flow diagram depicting method used for alerting a stakeholder of a depleting condensate neutralizing material condition and steps taken to facilitate replenishment of condensate neutralizing material.

FIG. 10 is a flow diagram depicting a method used for alerting a stakeholder of a depleting condensate neutralizing material condition and steps taken to facilitate replenishment of condensate neutralizing material. The stakeholder is given time to replenish the depleting material. However, if the depleting condition is not corrected within this time allowance, an output can be actions that indicate a higher urgency to replenish the condensate neutralizing material is provided.

Figure 11:
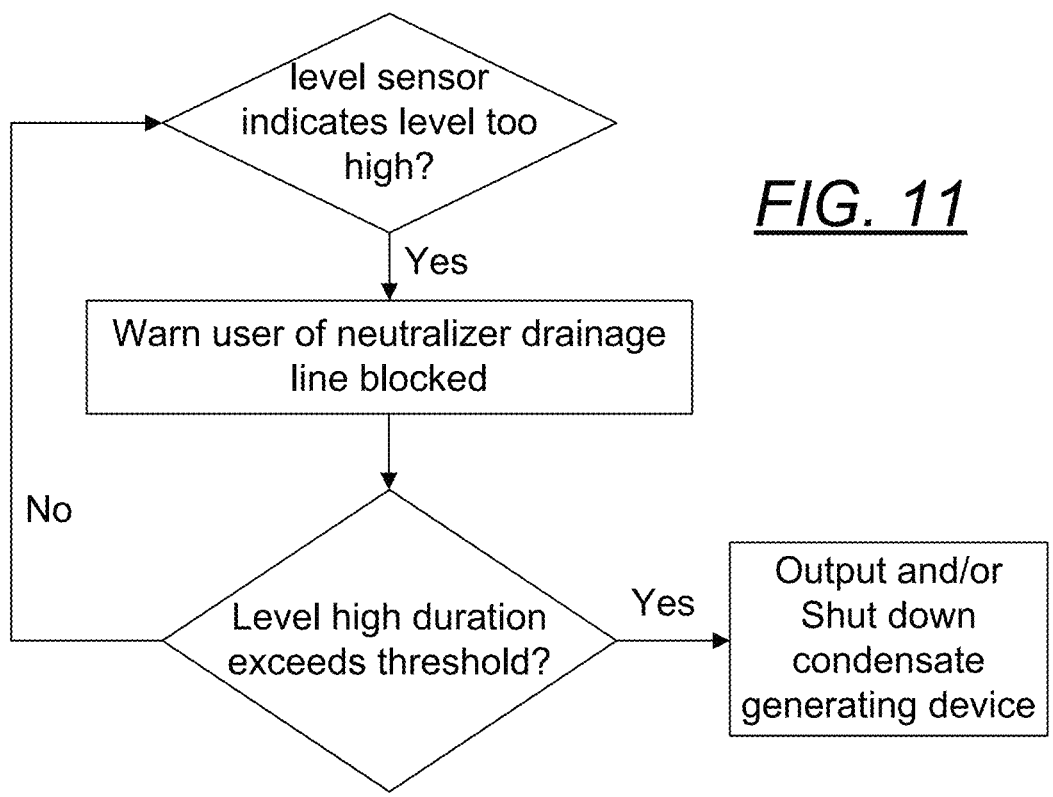
FIG. 11 is a flow diagram depicting a method used for alerting a stakeholder of a blockage in a condensate neutralizer system.

FIG. 11 is a flow diagram depicting a method used for alerting a stakeholder of a blockage in a condensate drainage system. Referring to FIGS. 1-4 and 11, the condensate is communicated to the container 50 via a drainage line 56 and the condensate neutralizer system further includes a level sensor 14 configured for indicating the level of the condensate in the drainage line and the indicated level is configured to be compared to a pre-determined level and if the indicated level is determined to be higher than the pre-determined level, an output is effected. It shall be noted that the level sensor 14 is mounted at an elevation that is normally higher than the condensate level. However if a backup has occurred, the condensate level will continue to rise, eventually tripping the level sensor 14. The output can be actions that indicate that the drainage will need to be checked for blockage.

Figure 12:
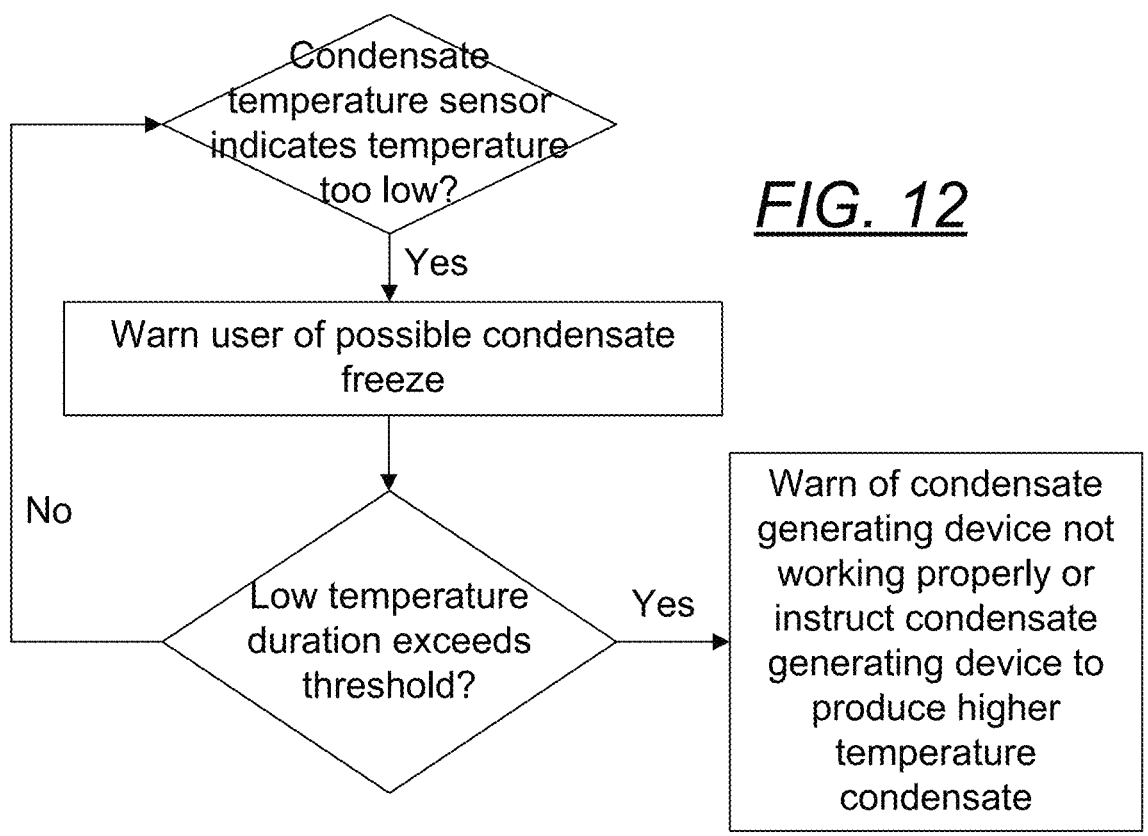
FIG. 12 is a flow diagram depicting a method used for alerting a stakeholder of an abnormality in a condensate neutralizer system.

FIG. 12 is a flow diagram depicting a method used for alerting a stakeholder of an abnormality in a condensate neutralizer system. Referring to FIGS. 1-4 and 12, the condensate neutralizer system 2 further includes a temperature sensor 16 configured for indicating a temperature of the condensate at the inlet of the container 50, wherein the indicated temperature is configured to be compared to a pre-determined temperature and if the indicated temperature is determined to be lower than the pre-determined temperature, an output is effected. The output can be actions that indicate that the condensate generating device will need to be checked for its proper operation or the condensate generating device can be instructed to produce higher temperature condensate.

FIG. 13 is a diagram depicting the factors considered in calculating the efficiency of a condensate generating device. Referring to FIGS. 1-4 and 13, the condensate neutralizer system further includes a health monitoring system configured for monitoring the health of the condensate generating device. In one embodiment, the health monitoring system includes:

(a) a first temperature sensor configured for indicating the temperature of a medium at an inlet of the condensate generating device;

(b) a second temperature sensor configured for indicating the temperature of the medium at an outlet of the condensate generating device;

(c) a first flowrate sensor configured for indicating the flowrate of the medium through the condensate generating device, wherein an energy output quantity is calculated by deriving the amount of energy used in raising the temperature of the medium at the inlet of the condensate generating device to the temperature of the medium at the outlet of the condensate generating device in a period of time given the flowrate of the medium through the condensate generating device in the period of time; and (d) a second flowrate sensor configured for indicating the flowrate of a fuel supply to the condensate generating device that causes the difference between the temperature of the medium at the outlet and the inlet of the condensate generating device, wherein an energy input quantity is calculated by deriving the amount of energy put into the condensate generating device from the flowrate of the fuel supply over the period in which the temperature of the medium is raised from the temperature of the medium at the outlet of the condensate generating device and temperature of the medium at the outlet of the condensate generating device,
wherein a ratio of the energy output quantity to the energy input quantity is compared to a pre-determined efficiency and if the pre-determined efficiency is greater than the ratio by a pre-determined amount, an output is effected. The output can be actions that indicate that the condensate generating device is operating at an efficiency that is close to an expected efficiency.

It can then be summarized that the computed energy input into the condensate generating device is energy per unit of fuel multiplied by units of fuel and the energy used to raise medium (water) temperature is mass flowrate MF multiplied by the difference between the outlet temperature OT and inlet temperature IT and multiplied by the specific heat SF of the medium (water).

FIG. 14 is a diagram depicting the factors considered in estimating the consumption of condensate neutralizing material. Referring to FIGS. 1-4 and 14, the controller is further configured to estimate the amount of usage of the condensate neutralizing material by summing:

(a) a first amount of generated condensate, wherein the first amount of generated condensate is calculated by multiplying a first condensate generating rate corresponding to rate at which condensate is generated when the condensate generating device operates in a high efficiency mode and the amount of time the condensate generating device operates in the high efficiency mode; and (b) a second amount of generated condensate, wherein the second amount of generated condensate is calculated by multiplying a second condensate generating rate corresponding to rate at which condensate is generated when the condensate generating device operates in a lower efficiency mode and the amount of time the condensate generating device operates in the lower efficiency mode.

Figure 15:
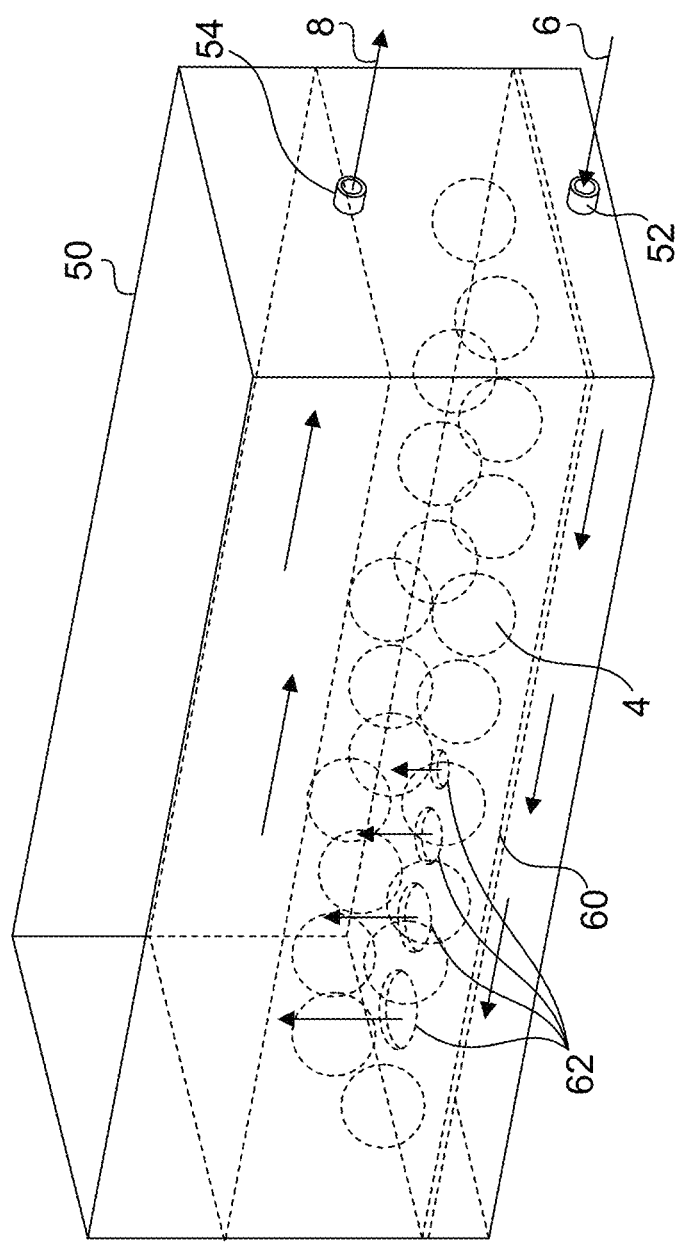
FIG. 15 is a partially transparent top perspective view of one embodiment of a condensate neutralizer system.

It can then be summarized that the computed cumulative condensate generated=$X*tx+Y*ty$
where:
tx=duration in which condensate generating device operates in high efficiency mode
ty=duration in which condensate generating device operates in lower efficiency mode
X=amount of condensate generated per unit time when condensate generating device operates in high efficiency mode
Y=amount of condensate generated per unit time when condensate generating device operates in lower efficiency mode FIG. 15 is a partially transparent top perspective view of one embodiment of a condensate neutralizer system. Disclosed is a container 50 including an inlet 52 and an outlet 54 connected to the container 50. In use, pre-treated condensate 6 is received via the inlet 52 into the container 50 and post-treated condensate 8 is discharged via the outlet 54 from the container 50. A baffle 60 divides the container into a lower space or compartment and an upper space or compartment. Communication between materials of the two compartments occurs only through the apertures 62 disposed on the baffle 60. As shown in FIG. 15, four apertures 62 of varying sizes are disposed on baffle 60 with the aperture 62 closest to the inlet 52 being the smallest and the aperture 62 farthest from the inlet 52 being the largest. As the apertures 62 are disposed on the far end of the baffle 60 from the inlet 52, upon entering the container 50 via the inlet 52 and flowing through the apertures 62, the pre-treated condensate 6 is forced through condensate neutralizing materials 4 before exiting via outlet 54. As the pre-treated condensate enters the lower compartment, it is more strongly drawn to the far end from the inlet 52 as the apertures are larger. Therefore, the condensate is afforded appropriate dwell time in the upper compartment while exposed to the condensate neutralizing materials 4. The baffle 60 need not be constructed as a single unit with the container. In one embodiment, the baffle 60 is a member formed in a shape of the cross section of the space of the container and removably secured in place. The baffle 60 may be hingedly connected to the container 50 or capable of being completely removed from the container 50. Condensate neutralizing materials 4 may be made available in perforated bags, nettings, etc., or may come unpackaged. In one embodiment, there is further provided a basket configured to be disposed within the upper space to hold condensate neutralizing materials 4 in order to ease replacement or replenishment of the condensate neutralizing materials. In replenishing the condensate neutralizing materials, the basket of depleting condensate neutralizing materials may simply be removed and replaced with a fresh basket containing such unused condensate neutralizing materials.

In yet another embodiment, a heat or BTU meter is provided and a real time or up-to-date energy pricing is obtained via internet connection. As energy usage is available from this meter and energy pricing is available, a stakeholder of the condensate generating device can be notified of the cost of operating the condensate generating or another device. The period/s yielding the least cost can then be identified such that the condensate generating or another device may be operated at these periods.

In yet another embodiment, boiler cycles are used to estimate whether a condensate generating device operated properly. The frequency or duration of operation of a condensate generating device directly corresponds to the amount of heat generated which can be estimated by the volume of a medium heated to a temperature by the condensate generating device. If the heat output of a condensate generating device is not commensurate with the boiler cycles reported, at least one stakeholder of the condensate generating device is notified.

Figure 16:
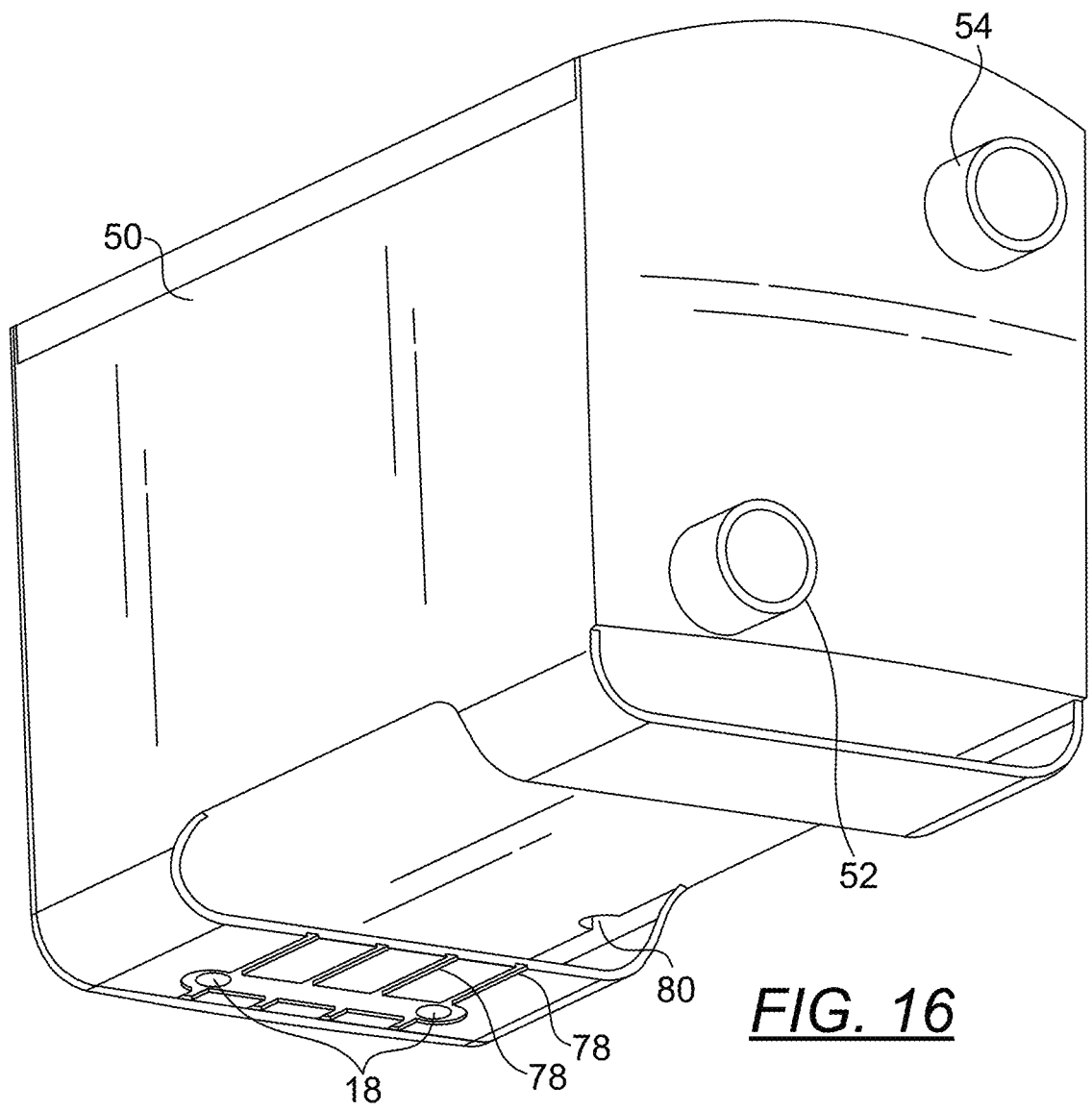
FIG. 16 is a bottom front perspective view of one embodiment of a condensate neutralizer system.

FIG. 16 is a bottom front perspective view of one embodiment of a condensate neutralizer system. It shall be noted that in this embodiment, a plurality of capillaries 78 are disposed on a bottom surface of the container 50. The leak sensor 18 is disposed adjacent such capillaries 78. It shall also be noted that at least one overflow channel 80 of the container 50 is disposed in the vicinity of the capillaries 78. Therefore, if a blockage had occurred at the outlet 54 or if a large leak had occurred, e.g., due to a water leak in the condensate generating device, an overflow of the fluid contents of the container 50 will be detected by the leak sensor 18, aided in part by capillary action, of the capillaries 78 which tend to draw the overflow fluid contents to the leak sensor 18. In one embodiment, an electrical conductivity sensor is provided to detect whether the overflow fluid contents is mostly condensate or water in addition to the leak sensor 18. If the overflow fluid contents are determined to be mostly condensate, then the leak may be attributed to a blockage of the outlet of the container. If the overflow fluid contents are determined to be mostly water, then the leak may be attributed to the condensate generating device. In the embodiment shown, the leak sensor 18 is capable of detecting the electrical conductivity of the overflow fluid contents in addition to its role in detecting a leak (liquid). There are two parts to the leak sensor 18. If a weak pulse is initiated in a first of the two parts, a leak spanning and coming in contact with the two parts will cause the initiated pulse to be detected in a second of the two parts. The magnitude of the pulse indicates the type of liquid the overflow fluid contents.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A condensate neutralizer system comprising:
a container comprising a first end, a second end, a baffle adapted to divide said container into an upper space and a lower space, an inlet disposed on said first end of said container in said lower space, an outlet disposed on said first end of said container in said upper space, a plurality of apertures disposed on said baffle between said first end of said container and said second end of said container, said plurality of apertures increase in size from said first end to said second end, wherein said upper space is configured to receive a condensate neutralizing material and said inlet of said container is configured to receive a condensate that flows through said lower space, said plurality of apertures, the condensate neutralizing material in said upper space to exit through said outlet of the container.

2. The condensate neutralizer system of claim 1, further comprising a sensor configured for detecting a leak from said container and the conductivity of the contents of said leak to isolate the source of said leak to a case selected from the group consisting of a blockage in said outlet and a leak generated outside of said condensate neutralizer system.

3. The condensate neutralizer system of claim 1, wherein said container further comprises a bottom surface, a leak sensor and at least one capillary disposed on said bottom surface adjacent said leak sensor, said at least one capillary is configured for drawing a leak to said leak sensor.

\* \* \* \* \*